United States Patent

[15] 3,647,937

Jorgensen

[45] Mar. 7, 1972

[54] WEATHERPROOF BUS DUCT JOINT STRUCTURE HAVING SELECTIVELY REMOVABLE PARTS

[72] Inventor: George N. Jorgensen, Oxford, Ohio
[73] Assignee: Square D Company, Park Ridge, Ill.
[22] Filed: Oct. 2, 1970
[21] Appl. No.: 77,671

[52] U.S. Cl. .................................................174/88 B, 174/68 B
[51] Int. Cl. .................................................H02g 3/28
[58] Field of Search.....................174/88 B, 99 B, 71 B, 72 B, 174/68 B, 16 B

[56] References Cited

UNITED STATES PATENTS 3,365,537   1/1968   Fehr, Jr. et al. .......................174/88 B

*Primary Examiner*—Darrell L. Clay
*Attorney*—Harold J. Rathbun and Paul J. Rose

[57] ABSTRACT

The joint structure includes a pair of joint tie channels with gaskets and a pair of joint covers with gaskets, one of the joint covers having a captive nut and the other of the joint covers having a removable closing cap for providing access to a joint bolt threaded into the captive nut. For horizontal edgewise mounting of a pair of bus duct sections, the gasket material is removed from the bottom tie channel. For horizontal flatwise mounting, the closing cap is removed from its joint cover, which is disposed at the bottom of the joint. For vertical mounting, the gasket material is removed from the lower edges of both joint covers.

3 Claims, 11 Drawing Figures

Patented March 7, 1972 3,647,937
4 Sheets-Sheet 1
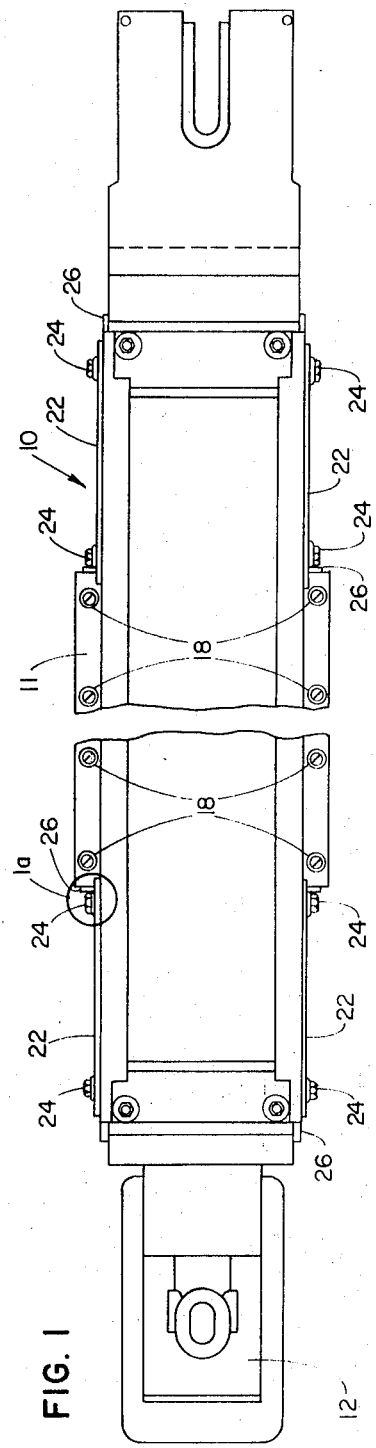
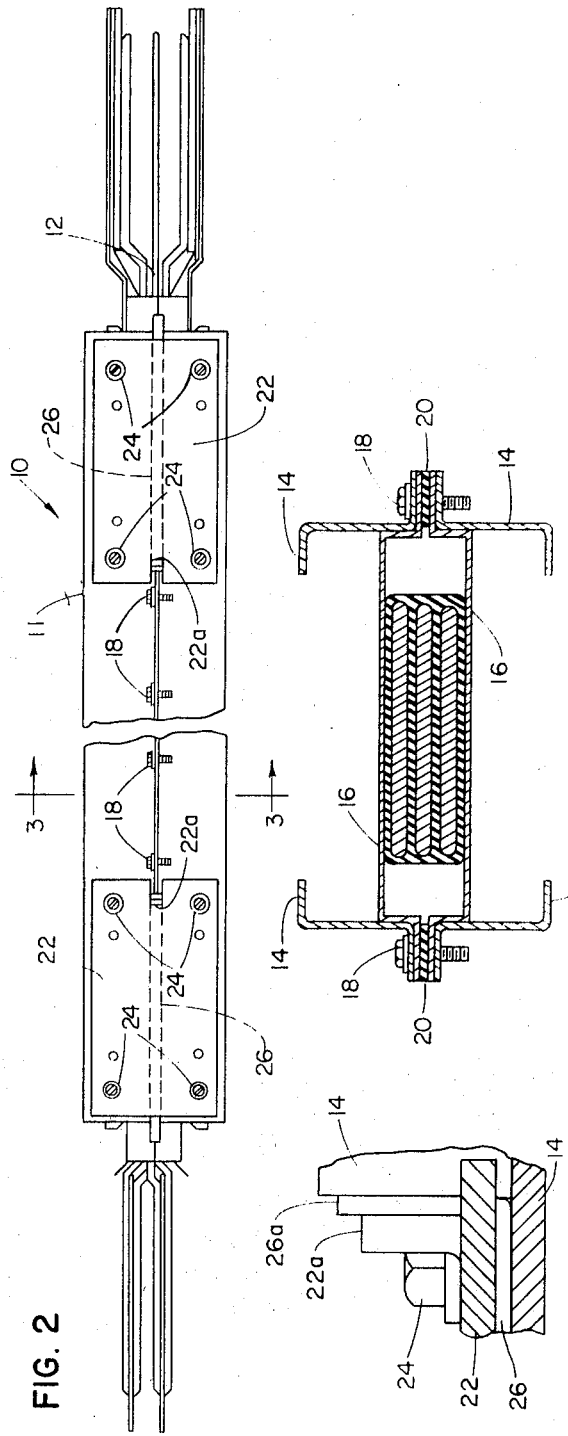
INVENTOR.
GEORGE N. JORGENSEN

INVENTOR.
GEORGE N. JORGENSEN

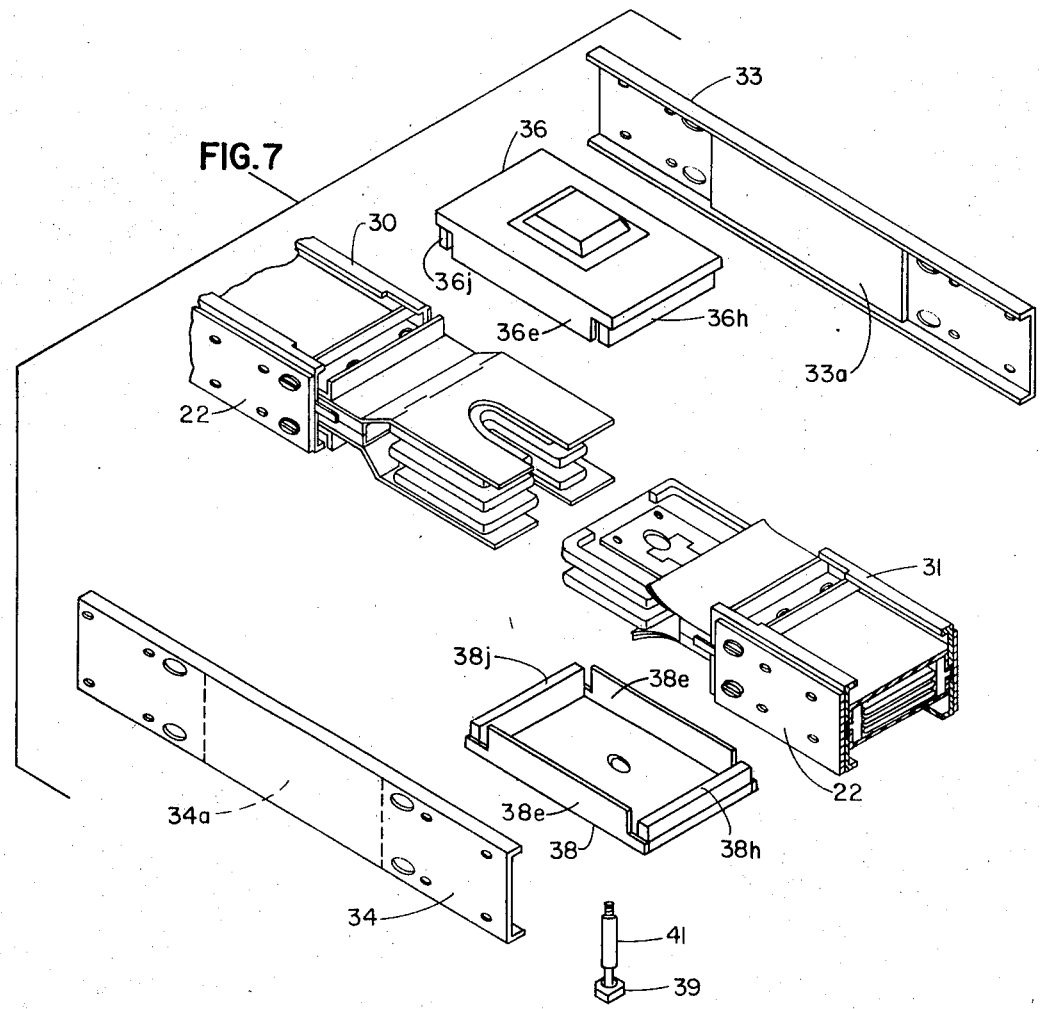

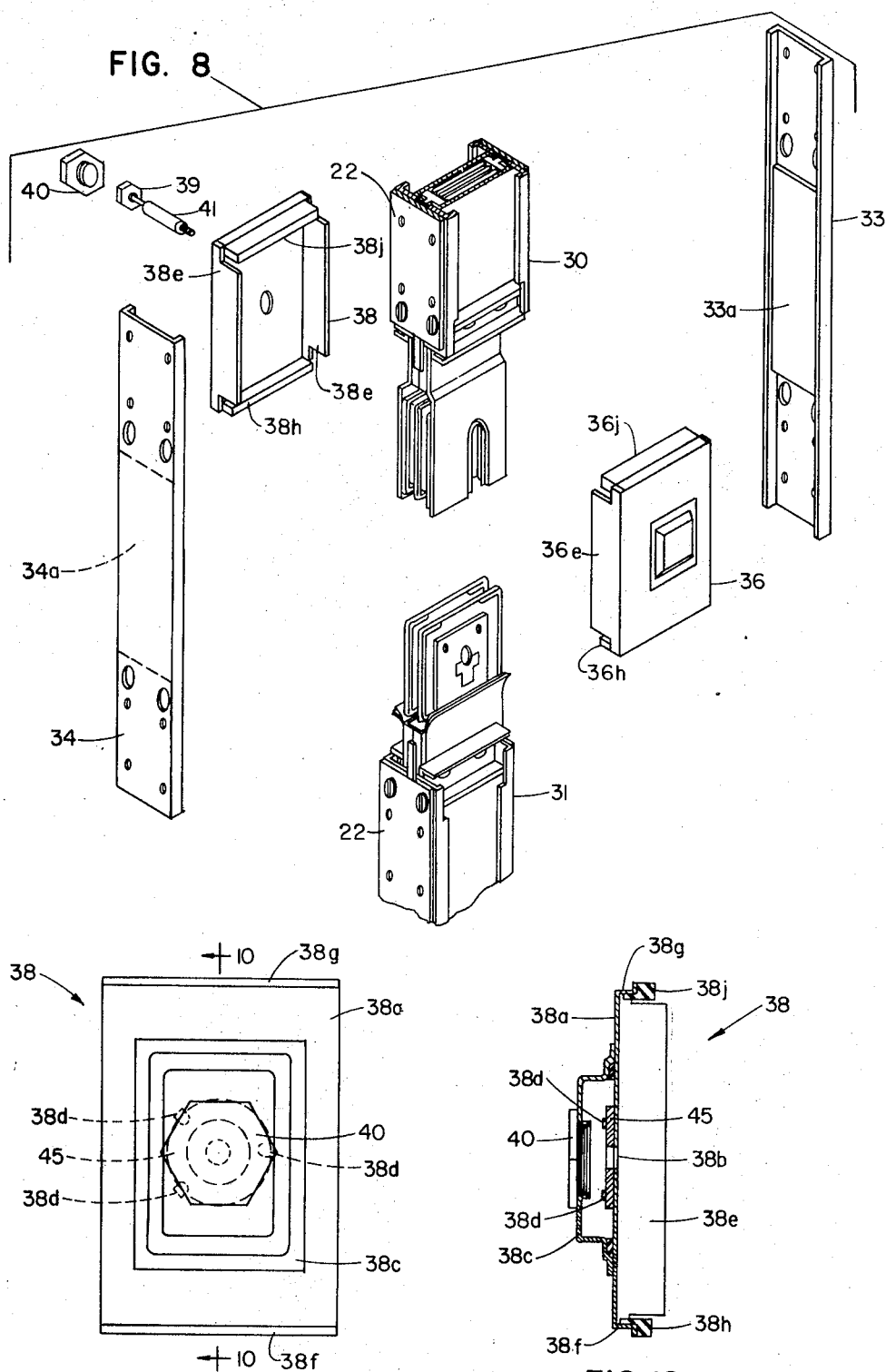

WEATHERPROOF BUS DUCT JOINT STRUCTURE HAVING SELECTIVELY REMOVABLE PARTS

Joint structures for weatherproof bus duct should be designed to prevent rainwater from entering, but to allow any water which does happen to get in, or any condensed moisture, to run out of the joint structure in any position in which the joined bus duct sections are mounted. In former bus duct joint structures, three different types of joint cover sets with differently located drain holes had to be stocked and selectively furnished to the installer in accordance with the planned mounting position of the bus duct sections. It was possible for a careless workman to install the joint covers with the rather nonprominent drain holes facing up, thereby allowing rainwater ready access to the joint structure and failing to allow the draining away thereof.

In accordance with this invention, only one type of joint cover set has to be stocked, and the joint structure as furnished is the same regardless of the planned mounting position of the joined bus duct sections, but various parts of the joint structure are selectively removable in accordance with various mounting positions of the joined bus duct sections. Instructions may be furnished with the joint structure advising which parts should be omitted according to the planned mounting position. Because the parts to be omitted are readily visible, it is more likely that the workmen will make a proper installation than when reliance is placed on the position of small drain holes.

An object of the invention is to provide an improved weatherproof bus duct joint structure.

Another object is to provide a weatherproof bus duct joint structure which is the same as furnished regardless of the planned mounting position of the joined bus duct sections.

A further object is to provide a weatherproof bus duct joint structure various parts of which are selectively removable in accordance with various mounting positions of the joined bus duct sections.

Still another object is to provide an improved method of ensuring drainage of any accumulated water from a bus duct joint structure in any of various mounting positions of the bus duct sections.

Other objects and advantages will become apparent when the following specification is considered along with the accompanying drawings, in which:

FIG. 1 is a longitudinal flatwise view of a section of weatherproof feeder bus duct connectable end-to-end with a like bus duct section in a joint structure constructed in accordance with the invention;

FIG. 1a is an enlarged view, partially in section, of circled portion 1a of FIG. 1;

FIG. 2 is a longitudinal edgewise view of the bus duct section of FIG. 1;

FIG. 3 is an enlarged sectional view taken along the line 3—3 of FIG. 2;

FIG. 4 is a somewhat schematic exploded perspective view of a weatherproof bus duct joint structure constructed in accordance with the invention and shown as applied to a pair of horizontal edgewise-mounted weatherproof bus duct sections like that of FIGS. 1–3;

FIG. 7 is a somewhat schematic exploded perspective view of a weatherproof bus duct joint structure constructed in accordance with the invention and shown as applied to a pair of horizontal flatwise-mounted weatherproof bus duct sections like that of FIGS. 1–3;

FIG. 8 is a somewhat schematic exploded perspective view of a weatherproof bus duct joint structure constructed in accordance with the invention and shown as applied to a pair of vertical weatherproof bus duct sections like that of FIGS. 1–3;

FIG. 9 is a view of the outer side of the other of the joint covers of a set of joint covers of a weatherproof bus duct joint structure constructed in accordance with the invention; and FIG. 10 is a sectional view taken along the line 10—10 of FIG. 9.

Figure 5:
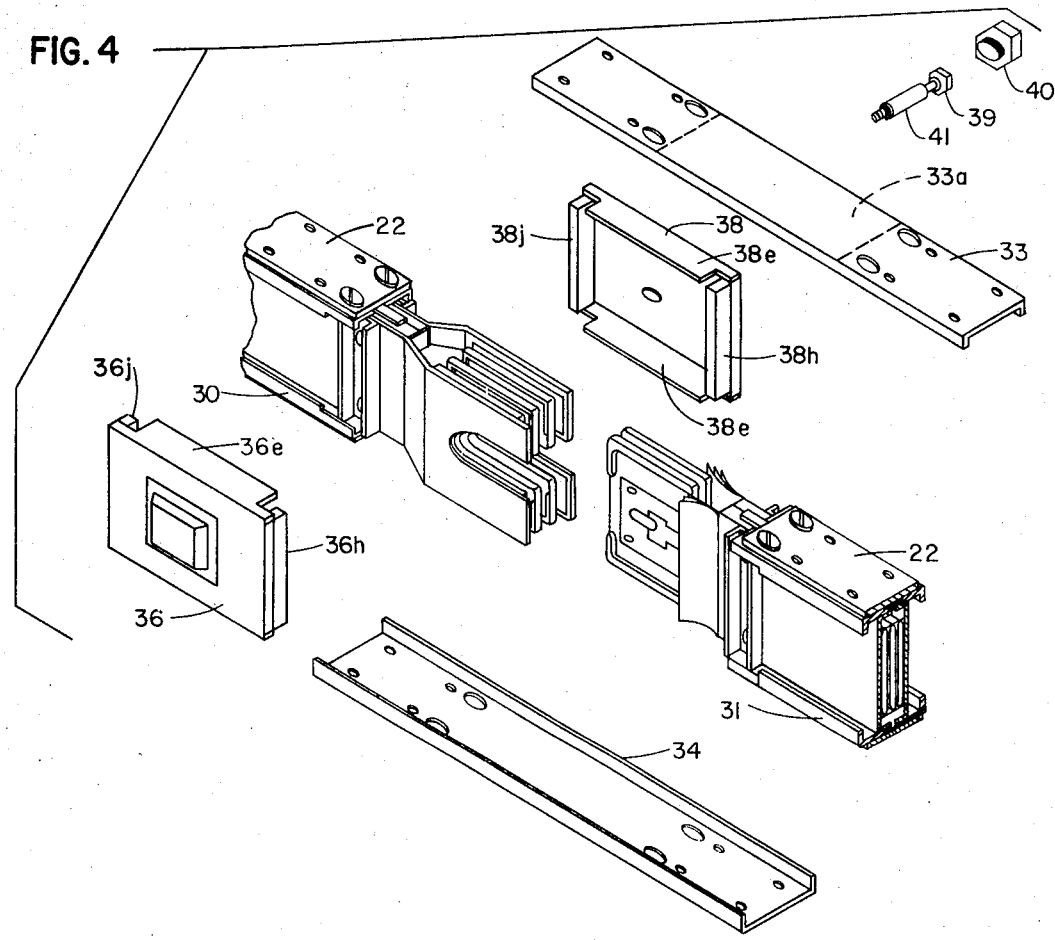
FIG. 5 is a view of the outer side of one of the joint covers of a set of joint covers of a weatherproof bus duct joint structure constructed in accordance with the invention.

A section 10 of weatherproof feeder bus duct is shown in FIGS. 1 and 2, a central portion being broken away. Basically, the bus duct section 10 includes an elongated housing 11 and an assembly 12 of bus bars contained therein. The bus bar assembly 12 may be similar to that disclosed in U.S. Pat. No. 3,187,086, issued June 1, 1965, but with opposite ends of the bus bars constructed as in U.S. Pat. No. 3,189,680, issued June 15, 1965.

As can be seen in FIG. 3, the housing 11 includes six structural members, namely four generally Z-shaped auxiliary housing members 14 and two outwardly flanged channel members 16, all secured together as shown by a plurality of screws 18. Two gaskets 20 are provided, each being disposed between a pair of flange portions of the channel members 16.

As shown in FIGS. 1 and 2, adjacent each end of the housing 11 and respectively on opposite sides thereof, two plate members 22 are secured by a plurality of screws 24 for additional mechanical strength at the joint of two joined bus duct sections 10. The outer flanges of the channel members 16 and corresponding portions of the Z-shaped members 14 are cut away adjacent opposite ends of the housing 11 to form flat surfaces for engagement respectively by the plate members 22. On the inner side of each plate member 22 is an elongated gasket 26 sealing the space between the respective pair of Z-shaped members 14, which are L-shaped in cross section under the plate members 22 where projecting portions have been cut away. As best shown in FIGS. 1a and 2, each plate member 22 has a bent tang 22a which holds an end portion 26a of the respective gasket 26 against cutaway end portions of the respective pair of Z-shaped members 14, the respective pair of cutaway flanges of the channel members 16, and an end portion of the respective gasket 20.

FIG. 4 is an exploded perspective view of a weatherproof bus duct joint structure for a pair of horizontal edgewise-mounted bus duct sections 30 and 31 which may be identical to the bus duct section 10, only a right-hand end portion of the bus duct section 30 and a left-hand end portion of the bus duct section 31 being shown. The joint structure includes a pair of joint tie channels 33 and 34, a joint cover 36, a joint cover 38, a joint bolt 39, and a threaded closing cap 40. The joint bolt 39 has an insulating sleeve 41 mounted thereon.

Figure 6:
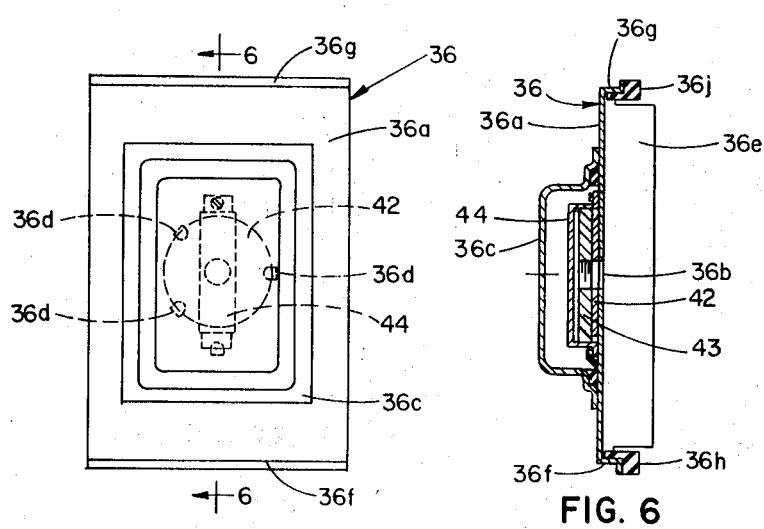
FIG. 6 is a sectional view taken along the line 6—6 of FIG. 5.

The joint cover 36 is best shown in FIGS. 5 and 6 and includes a main body portion 36a having a central hole 36b for receiving the joint bolt 39, and a sealing dome portion 36c permanently attached to the main body portion 36a as by welding. Before the sealing dome portion 36c is attached, the outer surface of the main body portion 36a is provided with a captive spring washer 42 and a captive nut 43. The washer 42 is held by three tangs 36d sheared from the main body portion 36a and bent over the washer 42. The nut 43 is held by a bracket 44 secured to the main body portion 36a in a suitable manner. For a better disclosure of the washer 42, nut 43, and bracket 44, reference may be had to FIGS. 1–3 of the aforementioned U.S. Pat. No. 3,189,680.

The joint cover 38 is best shown in FIGS. 9 and 10 and includes a main body portion 38a identical to the main body portion 36a and having a hole 38b for receiving the joint bolt 39. The cover 38 includes a sealing dome portion 38c permanently attached to the main body portion 38a as by welding and similar to the sealing dome portion 36c, but having a threaded access opening therein providing access to the joint bolt 39 and closable by the threaded closing cap 40. Before the sealing dome portion 38c is attached, the outer surface of the main body portion 38a is provided with a captive spring washer 45 identical to the washer 42 and held in place by three sheared and bent over tangs 38d, as in FIGS. 1–3 of the aforementioned U.S. Pat. No. 3,189,680.

Each of the main body portions 36a and 38a is elongated lengthwise of the bus duct sections 30 and 31 and is provided with a pair of opposite relatively deep inwardly extending longitudinal side flanges identified by numerals 36e on the joint cover 36 and 38e on the joint cover 38. Each of the main body portions 36a and 38a is also provided with a pair of opposite generally L-shaped relatively shallow inwardly extending transverse end flanges, as shown at 36f and 36g in FIG. 6 and at 38f and 38g in FIG. 10. The end flanges 36f and 36g are provided respectively with a pair of transversely extending gaskets 36h and 36j and the end flanges 38f and 38g are provided respectively with an identical pair of gaskets 38h and 38j.

The joint tie channels 33 and 34 are provided respectively with gaskets 33a (FIGS. 4, 7, and 8) and 34a (FIGS. 7 and 8).

In accordance with the invention, for the horizontal edgewise-mounted bus duct sections 30 and 31 of FIG. 4, the gasket 34a is removed from the lower joint tie channel 34; for the horizontal flatwise-mounted bus duct sections 30 and 31 of FIG. 7, the closing cap 40 is removed from the joint cover 38; and for the vertically mounted bus duct sections 30 and 31 of FIG. 8, the lower gaskets 36h and 38h are removed respectively from the joint covers 36 and 38.

Thus, it will be seen that to provide drainage from the joint, the gasket 34a, the closing cap 40, and the gaskets 36h and 38h taken together, are selectively removable in accordance with the various mounting positions of the bus duct sections 30 and 31. Of course, if the bus duct sections 30 and 31 as shown in FIG. 4 were inverted, the gasket 33a would be removed rather than the gasket 34a, and if the bus duct sections 30 and 31 taken together as shown in FIG. 8 were inverted, the gaskets 36j and 38j would be removed, rather than the gaskets 36h and 38h.

It will also be seen that all parts are the same as furnished to the installer, and that at least one part must be positively removed for any of the mounting positions. Thus, the requirement of manufacturing and stocking three different types of joint cover sets, with drain holes of each type being located differently from the drain holes of each of the other types, is eliminated. Further, the required positive removal of at least one part for any mounting position will more likely result in a proper installation, as compared to the chance of inadvertently installing a joint cover of a former bus duct joint structure with the drain hole at the top.

I claim:

1. A weatherproof bus duct joint structure connecting a pair of bus duct sections each having an elongated housing and a plurality of flat elongated bus bars, each bus bar including opposite end portions extending outwardly of the housing respectively at opposite ends, and the bus bar end portions at one end of one of the bus duct sections being electrically connected respectively to the bus bar end portions at the other end of the other of the bus duct sections, the joint structure having parts selectively removable respectively in accordance with selected mounting positions of the bus duct sections to provide drainage of water in any of horizontal edgewise, horizontal flatwise, and vertical mounting positions and including a single pair of joint covers, a joint bolt, and a pair of elongated tie channels, each of the joint covers including an elongated main body portion having a hole therethrough receiving the joint bolt, a pair of transversely extending gaskets removably secured respectively to opposite end portions of the main body portion, and a sealing dome portion fixedly secured to the outer side of the main body portion over the hole, a first of the joint covers including a captive nut secured to the outer side of its main body portion in alignment with the hole and covered by its sealing dome portion, a second of the joint covers having an access opening in its sealing dome portion for providing access to the joint bolt and a closing cap removably secured in the access opening, each tie channel having an elongated gasket extending along the inside thereof, the joint covers being removably secured to the bus duct sections on opposite sides thereof solely by the captive nut and the joint bolt which extends through the hole of the main body portion of the second joint cover, through apertures in the bus bar end portions of the bus duct sections, and through the hole of the main body portion of the first joint cover and is threaded into the captive nut, each of the tie channels being secured adjacent opposite ends respectively to the housings of the bus duct sections on the opposite side thereof from the other of the tie channels, the gasket of a lower one of the tie channels being removed when the bus duct sections are mounted in a horizontal edgewise position, the second joint cover being a lower one of the joint covers and the closing cap for the access opening in the sealing dome portion of the second joint cover being removed when the bus duct sections are mounted in a horizontal flatwise position, and a lower one of the gaskets of each of the joint covers being removed when the bus duct sections are mounted in a vertical position.

2. A weatherproof bus duct joint structure as claimed in claim 1 wherein the main body portion of each of the joint covers includes a pair of opposed inwardly extending longitudinal side flanges.

3. A weatherproof bus duct joint structure as claimed in claim 1 wherein the main body portion of each of the joint covers includes a pair of opposed inwardly extending transverse end flanges and the transversely extending gaskets are disposed respectively adjacent the transverse end flanges.

* * * * *